(12) United States Patent
Albert

(10) Patent No.: US 10,336,231 B2
(45) Date of Patent: Jul. 2, 2019

(54) HEAD AND NECK REST

(71) Applicant: CJ Albert Builders Pty Ltd, Red Hill (AU)

(72) Inventor: Christopher John Albert, Woondum (AU)

(*) Notice: Subject to any disclaimer, the term of this patent is extended or adjusted under 35 U.S.C. 154(b) by 44 days.

(21) Appl. No.: 15/509,335

(22) PCT Filed: Sep. 29, 2015

(86) PCT No.: PCT/AU2015/050580
§ 371 (c)(1),
(2) Date: Mar. 7, 2017

(87) PCT Pub. No.: WO2016/049691
PCT Pub. Date: Apr. 7, 2016

(65) Prior Publication Data
US 2017/0274802 A1 Sep. 28, 2017

(30) Foreign Application Priority Data

Sep. 30, 2014 (AU) ................................. 2014903942
Jun. 2, 2015 (AU) ................................. 2015902135

(51) Int. Cl.
| | |
|---|---|
| *B60N 2/85* | (2018.01) |
| *B60N 2/64* | (2006.01) |
| *B60N 2/68* | (2006.01) |
| *B60N 2/818* | (2018.01) |
| *B60N 2/80* | (2018.01) |
| *B60N 2/891* | (2018.01) |

(52) U.S. Cl.
CPC ............... *B60N 2/85* (2018.02); *B60N 2/643* (2013.01); *B60N 2/682* (2013.01); *B60N 2/818* (2018.02); *B60N 2/891* (2018.02); *B60N 2002/899* (2018.02)

(58) Field of Classification Search
CPC ........ B60N 2/643; B60N 2/682; B60N 2/818; B60N 2/85; B60N 2/891; B60N 2002/899
See application file for complete search history.

(56) References Cited

U.S. PATENT DOCUMENTS

| | | | | |
|---|---|---|---|---|
| 5,531,505 A | * | 7/1996 | Baetz ..................... | B60N 2/847 297/408 |
| 5,586,810 A | * | 12/1996 | Liu ......................... | A47C 7/38 297/406 |
| 6,022,078 A | * | 2/2000 | Chang .................... | B60N 2/868 297/391 |

(Continued)

OTHER PUBLICATIONS

International Application PCT/AU2015/050580 Search Report dated Jul. 4, 2016.

(Continued)

*Primary Examiner* — James M Ference
(74) *Attorney, Agent, or Firm* — Dobbin IP Law P.C.; Geoffrey E. Dobbin

(57) ABSTRACT

A head rest assembly for a vehicle seat, the head rest assembly comprising a head support portion, a neck support portion and a pair of connection members adapted to connect the head rest assembly to the vehicle seat, wherein at least one of the pair of connection members is adapted for movement relative to the other of the pair of connection members so as to adjust a distance between the pair of connection members.

17 Claims, 7 Drawing Sheets

(56) References Cited

U.S. PATENT DOCUMENTS

| | | | | |
|---|---|---|---|---|
| 6,631,956 B2* | 10/2003 | Mauro | | B60N 2/80 297/410 |
| 6,883,870 B2* | 4/2005 | Jost | | B60N 2/838 297/391 |
| 7,066,544 B2* | 6/2006 | Tseng | | B60N 2/879 297/391 |
| 7,114,780 B1* | 10/2006 | Lee | | B60N 2/803 297/406 |
| 7,597,394 B2* | 10/2009 | Liu | | B60N 2/879 297/217.3 |
| 7,621,597 B2* | 11/2009 | Oda | | B29C 45/14549 297/391 |
| 8,016,352 B2* | 9/2011 | Liu | | G01C 21/265 297/217.3 |
| 8,066,329 B2* | 11/2011 | Liu | | B60N 2/879 297/407 |
| 8,308,236 B2* | 11/2012 | Ishimoto | | B60N 2/4228 297/216.12 |
| RE44,432 E* | 8/2013 | Bartels | | B60N 2/885 297/216.12 |
| 9,403,451 B2* | 8/2016 | Munemura | | B60N 2/888 |
| 9,539,922 B2* | 1/2017 | Mildner | | B60N 2/809 |
| 9,610,874 B2* | 4/2017 | Frotz | | B60N 2/4864 |
| 2004/0032541 A1* | 2/2004 | Rochel | | B60R 11/0235 348/825 |
| 2005/0006941 A1* | 1/2005 | Park | | B60N 2/856 297/406 |
| 2005/0253440 A1* | 11/2005 | Kotani | | B60N 2/885 297/410 |
| 2006/0236520 A1* | 10/2006 | Arai | | B23P 15/00 29/458 |
| 2007/0057559 A1* | 3/2007 | Miyahara | | B60N 2/20 297/397 |
| 2008/0100118 A1* | 5/2008 | Young | | B60N 2/888 297/404 |
| 2008/0296953 A1* | 12/2008 | Veine | | B60N 2/815 297/407 |
| 2009/0058161 A1* | 3/2009 | Meert | | B60N 2/80 297/397 |
| 2009/0200843 A1* | 8/2009 | Yokota | | B60N 2/888 297/216.12 |
| 2010/0052372 A1* | 3/2010 | Yu | | B60N 2/3011 297/61 |
| 2011/0187172 A1* | 8/2011 | Reel | | B60N 2/80 297/391 |
| 2012/0062010 A1* | 3/2012 | Holmes | | B60N 2/487 297/354.1 |
| 2012/0080927 A1* | 4/2012 | Lohmann | | B60N 2/3009 297/410 |
| 2012/0098316 A1* | 4/2012 | Matsushima | | B60N 2/818 297/391 |
| 2012/0104821 A1* | 5/2012 | Yetukuri | | B60N 2/80 297/391 |
| 2012/0217783 A1* | 8/2012 | Enoki | | B60N 2/4817 297/391 |
| 2012/0235460 A1* | 9/2012 | Fey | | B60N 2/818 297/410 |
| 2012/0261967 A1* | 10/2012 | Ahlbrand | | B60N 2/809 297/391 |
| 2013/0278027 A1* | 10/2013 | Brucato | | B60N 2/838 297/216.12 |
| 2016/0046218 A1* | 2/2016 | Worlitz | | B60N 2/4829 297/406 |
| 2016/0059754 A1* | 3/2016 | Tabata | | B60N 2/80 297/391 |
| 2016/0325651 A1* | 11/2016 | Wang | | B60N 2/859 |
| 2017/0008434 A1* | 1/2017 | Chang | | B60R 11/02 |
| 2017/0080876 A1* | 3/2017 | Chang | | B60N 2/879 |
| 2017/0113581 A1* | 4/2017 | Mussi | | B60N 2/4805 |
| 2017/0197530 A1* | 7/2017 | Line | | B60N 2/838 |

OTHER PUBLICATIONS

International Application PCT/AU2015/050580 Patentability Report dated Jul. 4, 2016.

* cited by examiner

HEAD AND NECK REST

CROSS REFERENCE TO RELATED APPLICATIONS

This application claims the benefit of PCT Application No. PCT/AU2015/050580 filed on Sep. 29, 2015 which is hereby incorporated herein by reference.

TECHNICAL FIELD

The present invention relates to a head and neck rest. In particular, the present invention relates to a head and neck rest for the occupants of a vehicle, such as a car.

BACKGROUND

The statements in this section merely provide background information related to the present disclosure and may not constitute prior art.

In most vehicles, the seats are provided with a head rest against which an occupant may rest their head during a journey for comfort. However, conventional head rests can only be adjusted in a limited manner, meaning that the head rest may not provide comfort or support for an occupant who, for instance, leans forward in their seat. This can lead to discomfort, particularly on long journeys.

In addition, conventional head rests typically provide negligible support for an occupant's neck, meaning that, in the event of a collision (and particularly a rear-end collision), injuries such as whiplash may occur.

Thus, there would be an advantage if it were possible to provide a head rest for a vehicle seat that provided improved comfort for an occupant of the vehicle, as well as providing improved support for the occupant's neck, particularly in the event of a collision (and particularly a rear-end collision).

SUMMARY

A head rest assembly is disclosed.

With the foregoing in view, the present invention in one form, resides broadly in a head rest assembly for a vehicle seat, the head rest assembly comprising a head support portion, a neck support portion and a pair of connection members adapted to connect the head rest assembly to the vehicle seat, wherein at least one of the pair of connection members is adapted for movement relative to the other of the pair of connection members so as to adjust a distance between the pair of connection members.

The head rest assembly may be of any suitable size, shape or configuration. Preferably, however, the head rest assembly is of a suitable size to be used in a vehicle (such as a car, truck, bus, airplane or the like). It will be understood that, particularly when the head rest assembly is being used by a driver or operator of a vehicle, the head rest assembly must be of a sufficient size to provide comfort and support to the driver without being so large as to impede the driver's view from the vehicle, including the ability to see other vehicles, obstacles, pedestrians, cyclists and the like.

While the shape of the head rest assembly is not critical to the invention, it is preferred that the head support portion comprises at least a front face against which the rear of the user's head is placed in use. In some embodiments of the invention, the front face of the head support portion may be provided with one or more comfort and support enhancement portions adapted to enhance the comfort of the user during use of the head rest assembly. The one or more comfort and support enhancement portions may be of any suitable form, and may comprise regions of additional padding, regions fabricated from a relatively soft material or the like. More preferably, however, the one or more comfort and support enhancement portions may comprise a recess or cavity or the like within the front face of the head support portion into which the rear of the user's head may be at least partially received. In some embodiments of the invention, the recess or cavity may be substantially concave.

It is envisaged that, when the rear of the user's head is received in the recess or cavity, the user's head is supported by the head support portion. In this way, not only is the comfort of the user improved, but the incidence of whiplash or injury to the user's neck may be reduced during a collision (and particularly a rear-end collision).

The neck support portion may be of any suitable size, shape of configuration. Preferably, however, the neck support portion is associated with the head support portion. The head support portion and the neck support portion may be fabricated separately to one another and adapted for fixed or temporary connection thereto. More preferably, however, the head support portion and the neck support portion are fabricated as a single unit. Thus, in this embodiment of the invention, the head support portion and the neck support portion together form a body.

It is envisaged that the neck support portion may depend from the head support portion. Preferably, in use, the head support portion is located above the neck support portion, such that, when a user's head is supported by the head support portion, the neck support portion is located below the head support portion in abutment with or adjacent to the user's neck. Thus, it is envisaged that the neck support portion may extend substantially downwardly in use from the head support portion.

In a preferred embodiment of the invention, at least a portion of the neck support portion may extend forwardly of the head support portion. In this way, the neck support portion may extend towards the rear of the user's neck and/or the top of the user's shoulders. It is envisaged that, in use, the neck support portion may be located in abutment with, or close proximity to, the back of a user's neck.

In a preferred embodiment of the invention, the neck support portion includes a front face that is located in abutment with, or close proximity to, the back of a user's neck in use. Preferably, the front face of the neck support portion may be shaped so as to provide a complementary shape to the back of the user's neck.

The head support portion and the neck support portion may be fabricated from any suitable material. The head support portion and the neck support portion may be fabricated from different materials to one another, although in a preferred embodiment of the invention, the head support portion and the neck support portion may be fabricated from the same material as one another. The head support portion and the neck support portion may be fabricated from one or more natural materials, such as wool, cotton, or the like, or from one or more synthetic materials, such as plastic (for example, polyurethane), or from a combination of the two. In a preferred embodiment of the invention, the head support portion and the neck support portion may be at least partially fabricated from a polymeric foam, such as polyurethane foam, polyvinyl chloride foam, Styrofoam or the like, or any suitable combination thereof. Most preferably, the head support portion and the neck support portion may be fabricated at least partially from polyurethane foam.

In some embodiments of the invention, the head support portion and/or the neck support portion may be provided with a cover member adapted to cover the material from which the head support portion and the neck support portion are fabricated. For instance, the cover member may include breathable material (such as cotton, silk, polyester or acrylic), stain-resistant material (such as nylon or Teflon), padded material (such as cotton, wool or polymer padding material) or the like adapted to improve the comfort of the user. The cover member may additionally be colored or provided with indicia so as to enhance the aesthetic appeal of the head rest assembly. Any suitable indicia may be provided, such as, but not limited to, words, letters, numbers, pictures and/or logos (such as a vehicle manufacturer's logo or the like).

In a preferred embodiment of the invention, the head support portion is fabricated so as to have a suitable thickness to absorb at least some of the forces experienced in the event of a collision (and particularly a rear-end collision), thereby cushioning the user's head and minimizing (or at least reducing) the likelihood of injury to the user.

As previously mentioned, the head rest assembly includes a pair of connection members adapted to connect the head rest assembly to the vehicle seat. The connection members may be of any suitable form, and may comprise clips, ties, press studs, zips or the like adapted to connect the head rest assembly to the vehicle seat. More preferably, however, the connection members comprise elongate members adapted to connect the head rest assembly to the vehicle seat.

In a most preferred embodiment of the invention, the connection members comprise a pair of posts or rods adapted to extend between the head support portion and/or the neck support portion (or the body) and the vehicle seat. It will be understood that typical vehicle seats are provided with receiving portions in the form of bores extending downwardly into the vehicle seat from an upper surface thereof. Thus, it is envisaged that the connection members comprise rods or posts adapted for insertion at one end thereof into the bores in the vehicle seat. The connection members may be retained in the bores using any suitable mechanism. Such mechanisms are known, and no further discussion of these is required.

The connection members may be fabricated from any suitable material, such as plastic, metal or the like. Preferably, however, the connection members may be fabricated from metal such as steel, aluminum or the like, or any suitable alloy thereof.

The connection members may be associated with the head support portion or the neck support portion of the head rest assembly. Preferably, however, the connection members may be associated with the head support portion of the head rest assembly, and the connection members may be connected to the head rest assembly at any suitable point on the connection members and the head rest assembly. For instance, the connection members may be connected to the head rest assembly at an end thereof (and preferably the opposite end of the connection members to the end that is inserted into the bores in the vehicle seat).

Alternatively, at least a portion of the connection members may be received in and/or retained in a receiving portion in the head support portion and/or the neck support portion. Preferably, the receiving portion is located in the head support portion, and more preferably in a lower region or lower surface of the head support portion. In this embodiment of the invention, it is envisaged that, in use, the connection members may extend between a lower region or lower surface of the head support portion and an upper surface of the vehicle seat.

As stated previously, at least one of the pair of connection members is adapted for movement relative to the other of the pair of connection members so as to adjust a distance between the pair of connection members. Any suitable distance between the pair of connection members may be adjusted, although in a preferred embodiment of the invention, a horizontal distance between the connection members may be adjusted. Without wishing to be bound by theory, different vehicle seats may have bores in which the connection members are received positioned at different distances from one another. Thus, by adjusting the horizontal distance between the connection members, the head rest assembly may be used with a plurality of different vehicle seats. Specifically, the horizontal distance between the connection members may be increased or decreased in order to allow the connection members to be spaced apart the correct distance to be inserted into the bores in a given vehicle seat.

The distance between the connection members may be adjusted using any suitable technique. For instance, the head rest assembly may be provided with a plurality of receiving portions in the form of bores. In this embodiment of the invention, at least one of the connection members may be disengaged from one bore and re-inserted into another so that the position of the connection member relative to the other connection member is adjusted. Alternatively, both connection members may be capable of removal from a bore and re-insertion into another bore.

In other embodiments of the invention, at least one of the connection members may be adapted for sliding movement relative to the other of the pair of connection members. In this embodiment of the invention the receiving portion may include a channel or slot into which an end of at least one connection member is received and retained. The connection member may thus be capable of sliding movement within the channel or slot relative to the other of the connection members, which may also be received in the channel or slot, or may be fixed in position within the head support portion. Sliding movement of the connection member may be achieved manually by a user physically moving the connection member relative to the other connection member, or automatically, such as through the use of one or more motors, chain drives, hydraulic or pneumatic rams or the like, or any suitable combination thereof.

The connection member may be able to slide freely within the channel or recess, or may be provided with a control mechanism (such as a ratchet mechanism or the like) adapted to control and/or limit the degree of movement of the connection member.

In a preferred embodiment of the invention, both of the pair of connection members may be adapted for movement relative to one another. Thus, both connection members may be capable of sliding within the channel or recess and so on. Each of the pair of connection members may be adapted for movement independent of the other of the pair of connection members. More preferably, however, the connection members may be associated with one another in such a manner that a movement of one of the connection members produces a corresponding movement of the other of the connection members. Preferably, the corresponding movement is a mirror image, so that as one connection member moves horizontally left, the other of the connection members moves horizontally right the same distance and vice versa. Advantageously, by ensuring that each connection member moves the same distance in an opposite direction, it may be ensured that the head rest assembly is positioned substantially centrally in line with the vehicle seat. In this way, the comfort enhancement portion in the front face of the head support portion may always be located in substantial alignment with the user's head when the user is sitting in the vehicle seat. This ensures that the user's comfort and safety is not compromised by the head support portion being located in the wrong position relative to the user's head and/or neck.

Preferably, each of the connection members may be associated with a movement mechanism including one or more linkage members. The linkage members for each connection member may be associated directly with one another such that the connection members move relative to one another around one or more pivot points on the linkage members or at the point of connection between the linkage members. Alternatively, the linkage members may be associated indirectly with one another via an intermediate member. Any suitable intermediate member may be provided, although in a preferred embodiment of the invention, the intermediate member may include one or more pivoting or rotating members, such that, upon pivoting or rotation of the intermediate member, the connection members may move relative to one another.

The movement mechanism may further comprise one or more stop members adapted to define the limit of inward and/or outward movement of one or both of the pair of connection members.

It is envisaged that, in some embodiments of the invention, the movement mechanism may be at least partially housed within a housing. Preferably, the housing may be at least partially located within the head support portion and/or the neck support portion. More preferably, the housing is at least partially located within the head support portion. Most preferably, the housing is entirely located within the head support portion. Thus, the head support portion may include a cavity at the interior thereof in which the housing is received and retained.

The housing may be of any suitable size, shape or configuration, although it will be understood that the housing must be smaller than the head support portion in order to be located therein. In embodiments of the invention in which the connection members are at least partially received in the housing, it is envisaged that the housing may comprise at least a pair of apertures therein through which the connection members enter the housing and are connected to the linkage members.

In embodiments of the invention in which the housing is located within the head support portion, it is envisaged that the connection members may be at least partially received within the head support portion. In other embodiments of the invention, the connection members may be at least partially received within the housing.

In a preferred embodiment of the invention, an upper region of the connection members may be associated with the movement mechanism or received in the receiving portion in the head support portion. More preferably, an upper region of the connection members may be fixedly or temporarily connected to the linkage members while a lower region of the connection members may be adapted for connection to a vehicle seat.

The connection members may be fabricated as a single member, or may be fabricated as two or more members adapted for fixed or temporary attachment to one another. In a preferred embodiment of the invention, the connection members include an upper portion and a lower portion. Preferably, the upper portion may be adapted for connection to the movement mechanism while the lower portion may be adapted for connection to the vehicle seat and to the upper portion.

The upper and lower portions of the connection members may be adapted for connection to one another using any suitable technique. For instance, the upper and lower portions may be adapted for screw-threaded connection, frictional connection or the like. Alternatively, one or more fasteners (screws, bolts, nails, rivets or the like) may be used to connect the upper and lower portions to one another. In a preferred embodiment of the invention, one of the upper or lower portions may be provided with a male connection portion adapted to be inserted into a female connection portion located on the other of the upper or lower portions. Optionally, the connection between the upper and lower portions may be enhanced through the use of one or more fasteners (such as a grub screw or the like).

It will be understood that the bores in the vehicle seats into which the lower portions of the connection members are received during use may vary in diameter between vehicles, or between vehicle manufacturers. Thus, the lower portions may be fabricated in a variety of sizes, and in particular, a variety of diameters. Specifically, the lower portions may be adapted to be interchangeable. In a preferred embodiment of the invention, it is envisaged that the lower portions of the connection members may be adapted for temporary connection to the upper portions of the connection members. In this way, a first lower portion may be disconnected from the upper portion and a second lower portion having a different diameter may be connected to the upper portion of the connection member. By doing this, the head rest assembly may be used with a variety of different vehicles having different size bores in the vehicle seats. This allows the head rest assembly to be retro-fitted to any suitable vehicle.

In some embodiments of the invention, the connection members may be substantially straight along their entire length. In alternative embodiments, however, the connection members may be provided with one or more bends or curves therein.

The one or more bends may be located in any suitable part of the connection members. Preferably, however, at least one bend or curve may be provided in an upper region (and more preferably, an upper portion) of the connection member.

It will be understood that the purpose of placing one or more bends or curves in the connection members may be to ensure that the head support portion and the neck support portion are angled towards the user so that, even if the user is leaning slightly forward in their seat, the head support portion and neck support portion are positioned so as to provide comfort and/or support to the user.

In a preferred embodiment of the invention, both connection members are provided with a bend or curve therein. Preferably, the bend or curve is such that the uppermost region of the connection members is angled forwardly of the remainder of the connection member to form an angled portion. The bend or curve may be of any suitable dimensions, although in a preferred embodiment of the invention, the included angle between the angled portion and the remainder of the connection member may be between 0° and 90°. More preferably, the included angle between the angled portion and the remainder of the connection member may be between 10° and 70°. Yet more preferably, the included angle between the angled portion and the remainder of the connection member may be between 15° and 50°. Most preferably, the included angle between the angled portion and the remainder of the connection member may be between 20° and 30°.

In another aspect, the invention resides broadly in a head rest assembly for a vehicle seat, the head rest assembly comprising a head support portion, a neck support portion and a pair of connection members adapted to connect the head rest assembly to the vehicle seat, wherein each of the pair of connection members comprise an upper portion and a lower portion adapted for connection to the vehicle seat and temporary connection to the upper portion, and wherein the lower portions are interchangeable with lower portions having different diameters.

The lower portions may be provided with any suitable diameters. However, most bores in vehicle seats have diameters of between about 10 mm and about 15 mm. Thus, it is envisaged that the lower portions may be fabricated so as to have diameters of between about 10 mm and about 15 mm. For instance, lower portions may be fabricated having a range of diameters, such as 10 mm, 10.5 mm, 11 mm, 11.5 mm, 12 mm, 12.5 mm, 13 mm, 13.5 mm, 14 mm, 14.5 mm and/or 15 mm. However, it will be understood that the lower portions could be fabricated to have any diameter so as to fit into the bores of a vehicle seat in any vehicle.

In some embodiments of the invention, at least one of the pair of connection members may be adapted for movement relative to the other of the pair of connection members so as to adjust a distance between the pair of connection members. Preferably, this may be achieved in the manner discussed in connection with the first aspect of the invention.

In yet another aspect, the invention resides broadly in a head rest assembly for a vehicle seat, the head rest assembly comprising a head support portion, a neck support portion and a pair of connection members adapted to connect the head rest assembly to the vehicle seat, wherein each of the pair of connection members are provided with at least one bend or curve therein, the at least one bend or curve being provided such that an uppermost region of the connection members is angled forwardly of a remainder of the connection member to form an angled portion.

It will be understood that the purpose of placing one or more bends or curves in the connection members may be to ensure that the head support portion and the neck support portion are angled towards the user so that, even if the user is leaning slightly forward in their seat, the head support portion and neck support portion are positioned so as to provide comfort and/or support to the user.

As previously stated, the at least one bend or curve is such that the uppermost region of the connection members is angled forwardly of the remainder of the connection member to form an angled portion. The bend or curve may be of any suitable dimensions, although in a preferred embodiment of the invention, the included angle between the angled portion and the remainder of the connection member may be between 0° and 90°. More preferably, the included angle between the angled portion and the remainder of the connection member may be between 10° and 70°. Yet more preferably, the included angle between the angled portion and the remainder of the connection member may be between 15° and 50°. Most preferably, the included angle between the angled portion and the remainder of the connection member may be between 20° and 30°.

In some embodiments of the invention, at least one of the pair of connection members may be adapted for movement relative to the other of the pair of connection members so as to adjust a distance between the pair of connection members. Preferably, this may be achieved in the manner discussed in connection with the first aspect of the invention.

The present invention provides numerous advantages over the prior art. For instance, the head rest assembly of the present invention provides improved comfort to a user, as well as improved support which can serve to reduce the likelihood of injury to the user in the event of a vehicle collision (and particularly a rear-end collision). In addition, the ability to adjust the position of the connection members relative to one another, and the interchangeability of the connection members, means that the head rest assembly may be used with a wide range of vehicles. This not only allows the head rest assembly to be retrofitted to any vehicle, but allows a user to transfer the head rest assembly from one vehicle to another, such as when the user owns more than one vehicle.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1A:
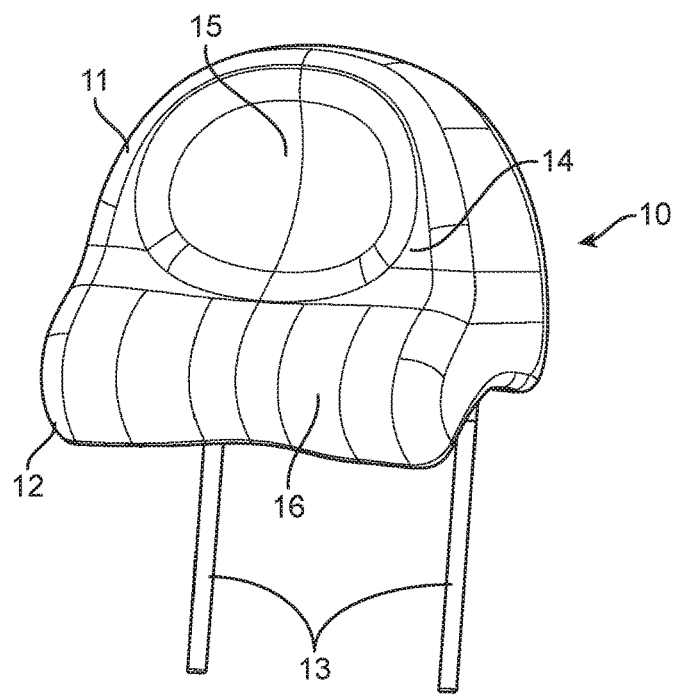
FIG. 1A illustrates an isometric view of a head rest assembly according to an embodiment of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1B:
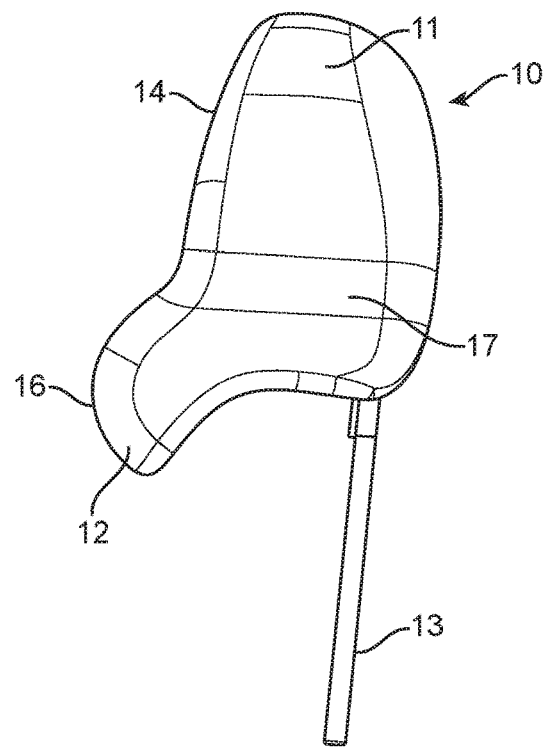
FIG. 1B illustrates a side view of a head rest assembly according to an embodiment of the present invention.

In FIGS. 1A and 1B there are illustrated perspective and side views, respectively, of a head rest assembly 10 according to an embodiment of the present invention. The head rest assembly 10 comprises a head support portion 11 and a neck support portion 12 extending downwardly and forwardly of the head support portion 11. The head support portion 11 and the neck support portion 12 together form a body 17.

The head rest assembly 10 further comprises a pair of connection members 13 in the form of steel posts that are associated with the body 17 at a first end (upper region)

thereof, while a second opposed end (lower region) of the connection members 13 is adapted for connection to a vehicle seat (not shown).

The front face 14 of the head support portion 11 includes a comfort enhancement portion in the form of a concave recess 15 into which a portion of the rear or a user's head (not shown) is received during use. It is envisaged that the user's comfort will be improved when the user's head is located at least partially within the recess 15, along with the support of the user's head in the event of a collision (and particularly a rear-end collision). Similarly, when the user's head is located at least partially within the recess 15 the front face 16 of the neck support portion 12 is located in abutment with, or close proximity to, the back of the user's neck, thereby reducing the likelihood of an injury such as whiplash during a collision (and particularly a rear-end collision).

Figure 2:
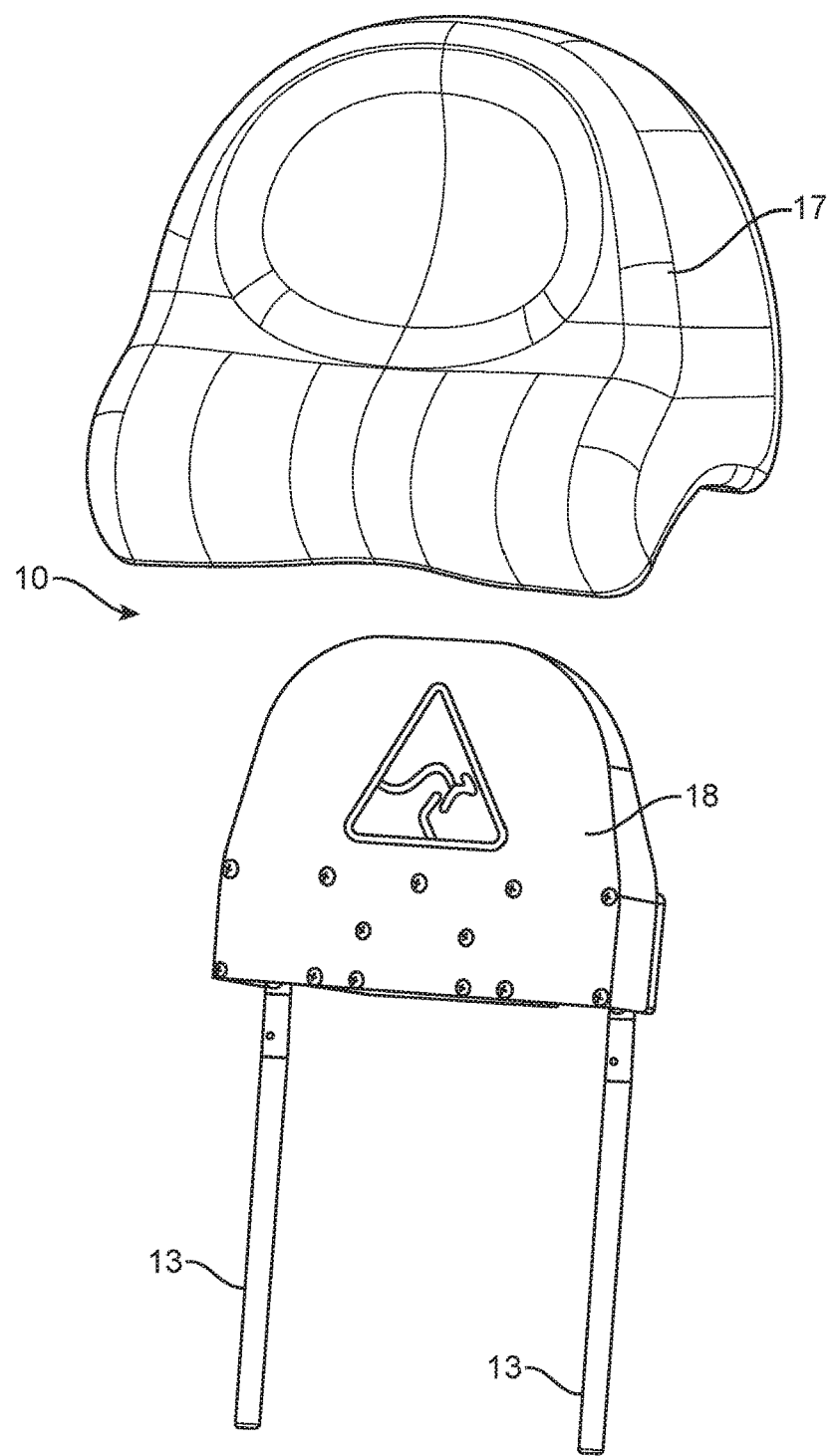
FIG. 2 illustrates an isometric view of a head rest assembly according to an embodiment of the present invention.

In FIG. 2 there is illustrated an isometric view of a head rest assembly 10 according to an embodiment of the present invention. The head rest assembly 10 of FIG. 10 is identical to that of FIGS. 1A and 1B, although in FIG. 2 the housing 18 for the movement mechanism (obscured) has been removed from the body 17. It will be noted in this FIG. that an upper region of the connection members 13 is received within the housing 18, and that the upper region of the connection members 13 is connected to the movement mechanism (obscured) within the housing 18.

Figure 3:
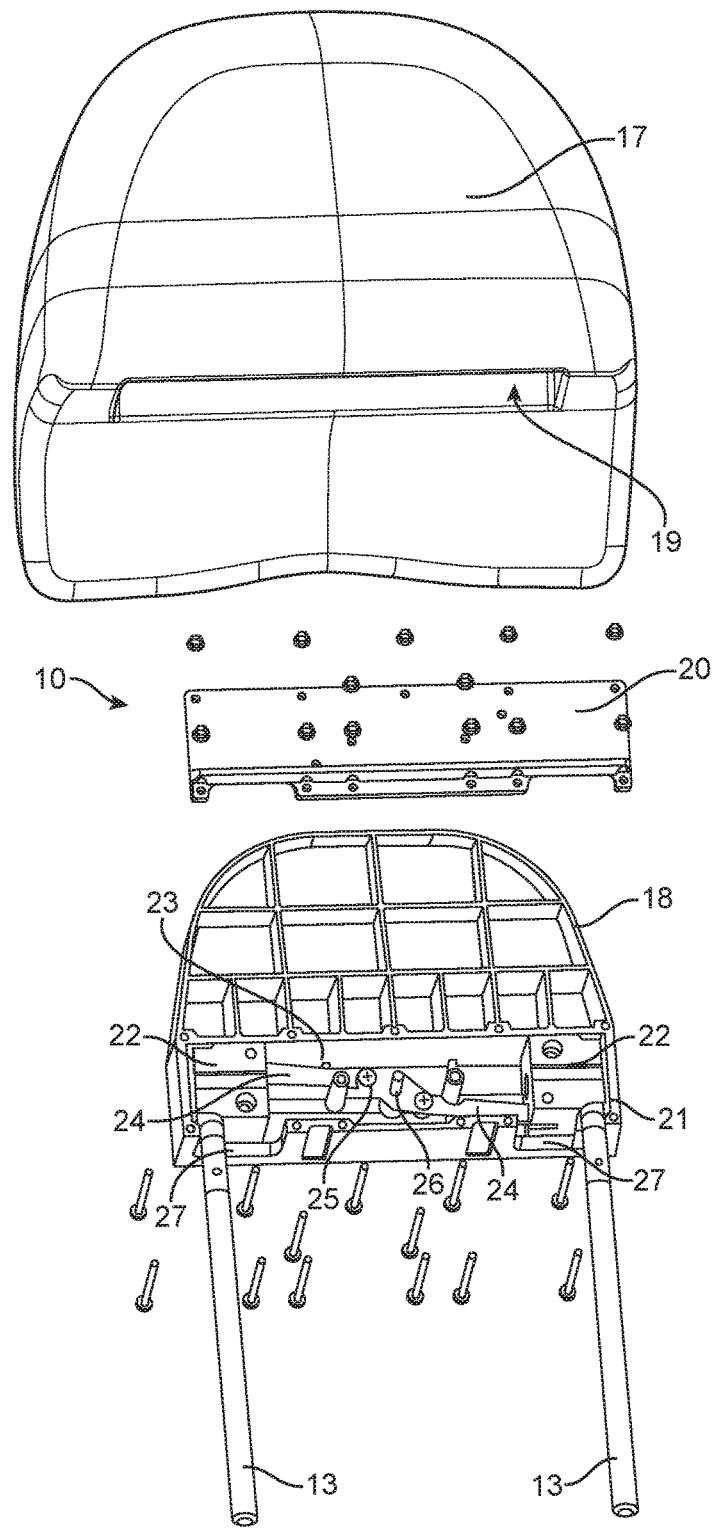
FIG. 3 illustrates an exploded view of a head rest assembly according to an embodiment of the present invention.

FIG. 3 illustrates an exploded view of a head rest assembly 10 according to an embodiment of the present invention. It will be noted that in this FIG. the opening 19 within the body 17 in which the housing 18 is received and retained during use may be seen.

In FIG. 3, a backing plate 20 of the housing 18 has been removed so that the movement mechanism 21 may be seen. The movement mechanism 21 comprises a pair of blocks 22 that are associated with the upper regions of the connection members 13 and are configured to slide within a channel 23 in the housing 18. The connection members 13 are connected to linkage members 24 that are in turn connected to a plate 25 that is rotatable about pivot pin 26.

In the embodiment of the invention shown in FIG. 3, the connection members 13 are as widely spaced apart as is possible. However, when a force is applied to a connection member 13 to move it inwardly, the plate 25 rotates about pivot pin 26, thereby moving both connection members 13 inwardly the same distance.

It will be noted that the apertures 27 through which the connection members 13 are received in the housing 18 are of a particular width. Thus, the width of the apertures 27 defines the limit of both inward and outward movement of the connection members 13.

Figure 4:
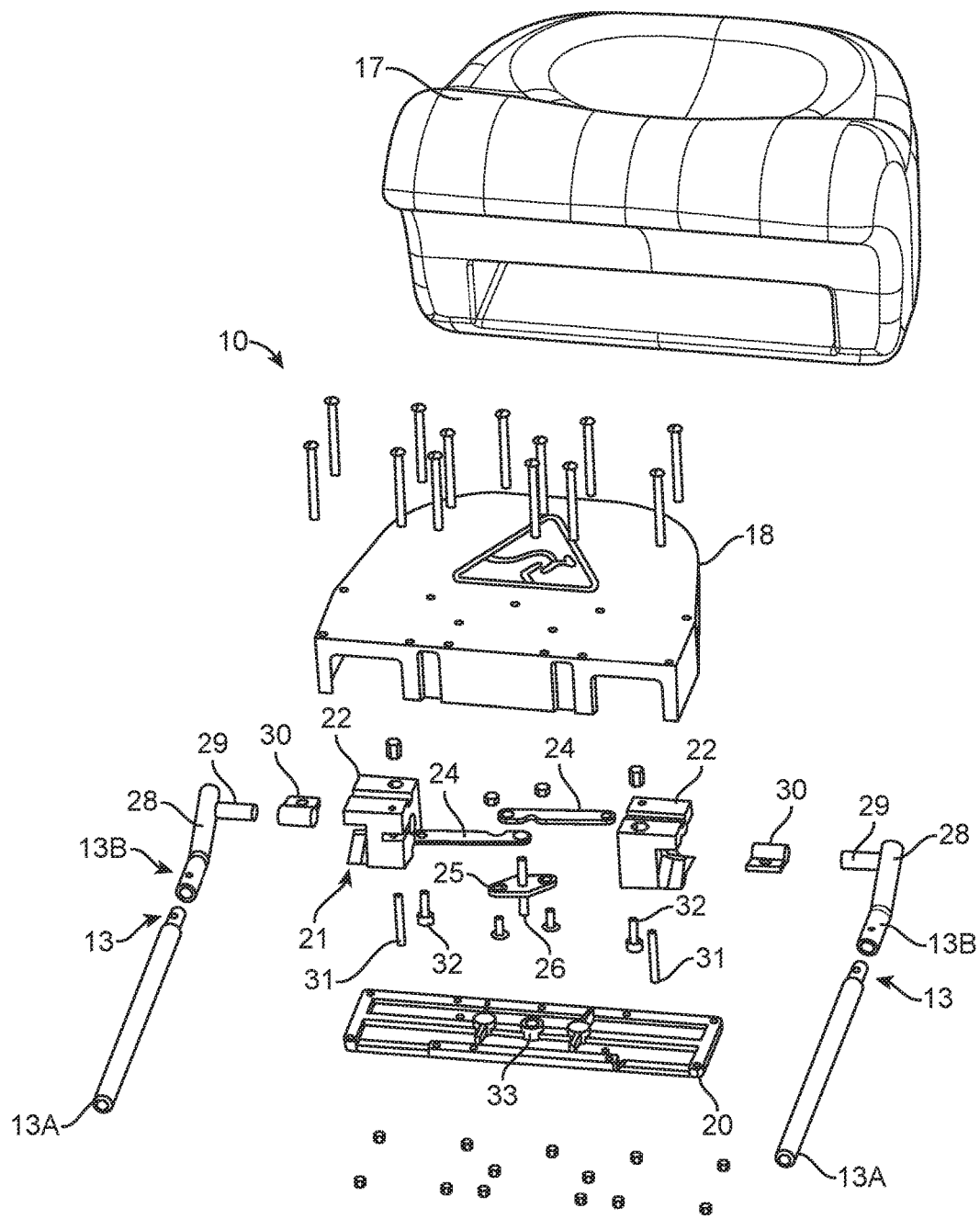
FIG. 4 illustrates an exploded view of a head rest assembly according to an embodiment of the present invention.

In FIG. 4, an exploded view of a head rest assembly 10 according to an embodiment of the present invention is illustrated. In the Figure, the movement mechanism 21 has been removed from the housing 18 so that the components of the movement mechanism 21 may be more clearly seen.

It may be seen in FIG. 4 that the connection members 13 comprise a lower portion 13A and an upper portion 13B adapted to be removably connected to one another. The upper portion 13B of each connection member 13 is provided with a bend therein so that an angled portion 28 is formed. When the head rest assembly 10 is assembled, the angled portions 28 serve to angle the body 17 towards the user's head (not shown).

Each angled portion 28 is provided with a projection 29 that extends inwardly towards the center of the housing 18. The projections 29 are received in clips 30 that are in turn connected to the blocks 22 by a bolt 32. Similarly, the linkage members 24 are connected to the blocks 22 at a first end thereof via pins 31. The opposed ends of the linkage members 24 are connected to the plate 25 which is retained in place within the housing 18 due to the pivot pin 26 being received and retained in bores 33 in the wall of the housing 18 and backing plate 20.

Figure 5:
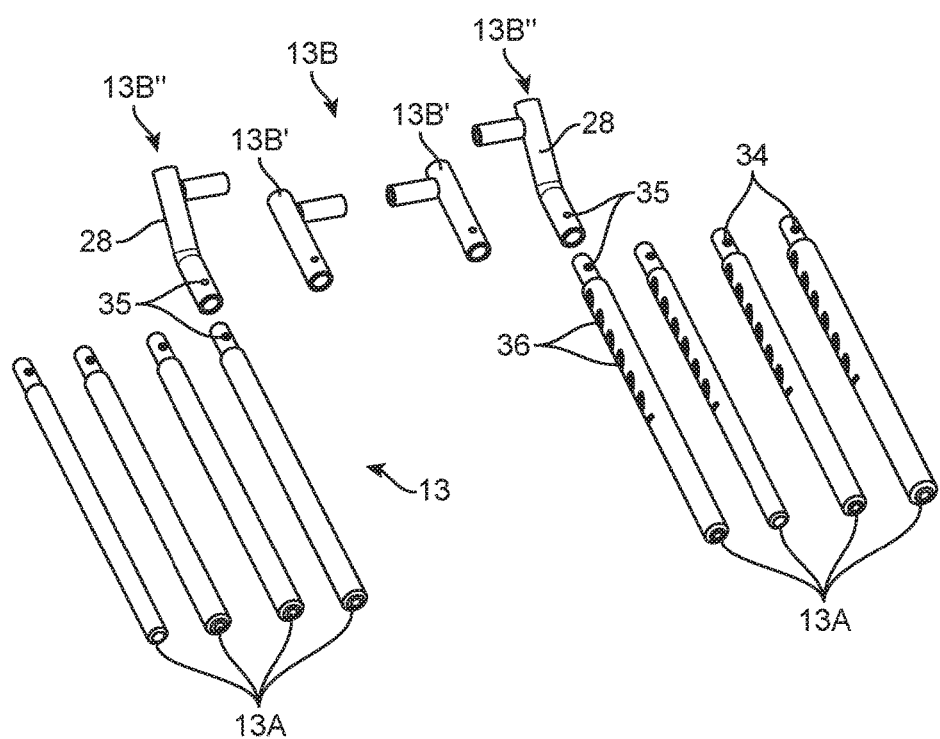
FIG. 5 illustrates an isometric view of connection members according to an embodiment of the present invention.

FIG. 5 illustrates an isometric view of connection members 13 according to an embodiment of the present invention. This FIG. illustrates the different shapes and sizes of connection members 13 that may be used.

Specifically, the upper portions 13B of the connection members 13 may comprise straight members 13B' or bent members 13B", with the bent members 13B" forming angled portions 28 that angle the body (not shown) towards the user's head. It is envisaged that the straight members 13B' will be used together, while the bent members 13B" will be used together. It is not anticipated that one straight member 13B' and one bent member 13B" will be used together.

The lower portions 13A of the connection members 13 comprise male connection portions 34 adapted to be inserted into the upper portions 13B. The upper portions 13B and lower portions 13A are provided with apertures 35 through which a fastener (not shown) is positioned so as to attach the upper portions 13B and lower portions 13A together during use.

The lower portions 13A are fabricated so as to have different diameters. This allows the lower portions 13A to be used in connection with any vehicle seat or any make of vehicle. It is envisaged that, when the heads rest assembly is being transferred from one vehicle to another, the lower portions 13A may be detached from the upper portions 13B and then a lower portion 13A of a different diameter to fit the vehicle to which the head rest assembly is being transferred may be attached to the upper portions 13B.

Each of the lower portions 13A is provided with a series of recesses 36 along its length, the recesses 36 being adapted to engage with a locking mechanism (not shown) in the vehicle seat (not shown).

Figure 6:
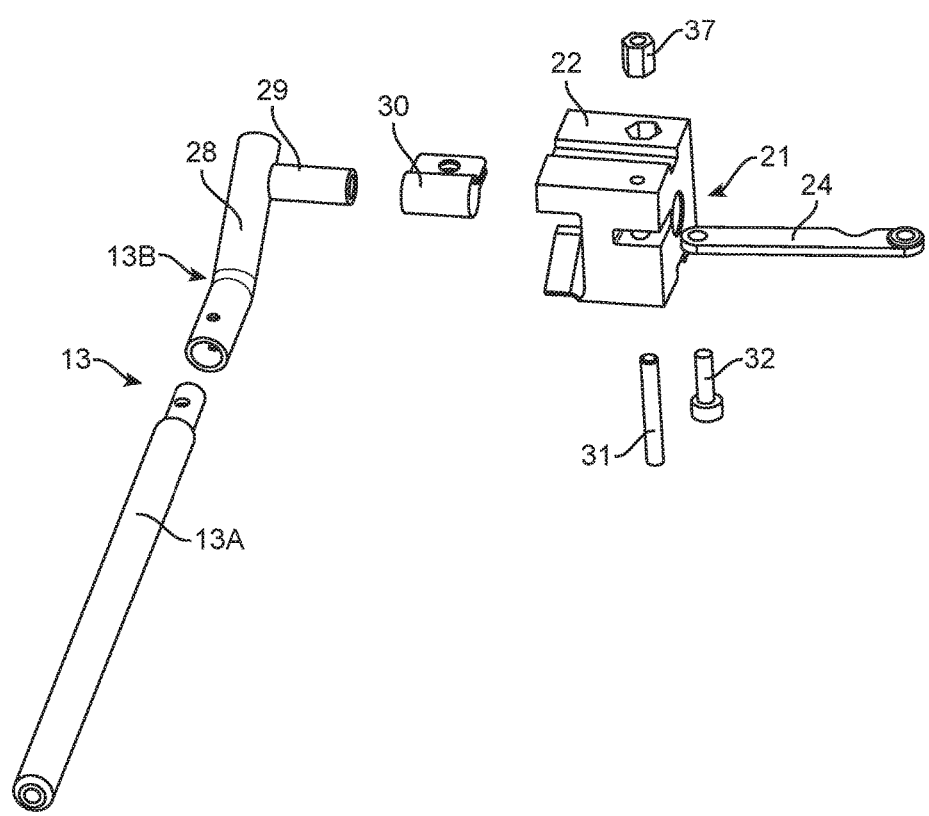
FIG. 6 illustrates a detailed view of a movement mechanism according to an embodiment of the present invention.

In FIG. 6 a detailed view of a movement mechanism 21 according to an embodiment of the present invention is shown. In FIG. 6, it may be seen that the connection member 13 comprises a lower portion 13A and an upper portion 13B adapted for connection to one another. The upper portion 13B includes an angled portion 28 that, in use, angles the body (not shown) towards the rear of the user's head.

The upper portion 13B includes a projection 29 that extends inwardly from the angled portion 28 and substantially perpendicular to the angled portion 28. The projection 29 is received in a clip 30. The clip is in turn received in block 22 and is secured thereto using a nut 37 and bolt 32. Linkage member 24 is also secured to the block 22 using a pin 31.

By connecting the connection member 13 to the block 22, movement of the connection member 13 results in sliding movement of the block 22. As the linkage member 24 is connected to a movement mechanism (not shown) on the other side of the rotating plate (not shown) a movement of the connection member 13 results in a corresponding movement of the connection member (not shown) on the other side of the rotating plate (not shown).

Figure 7:
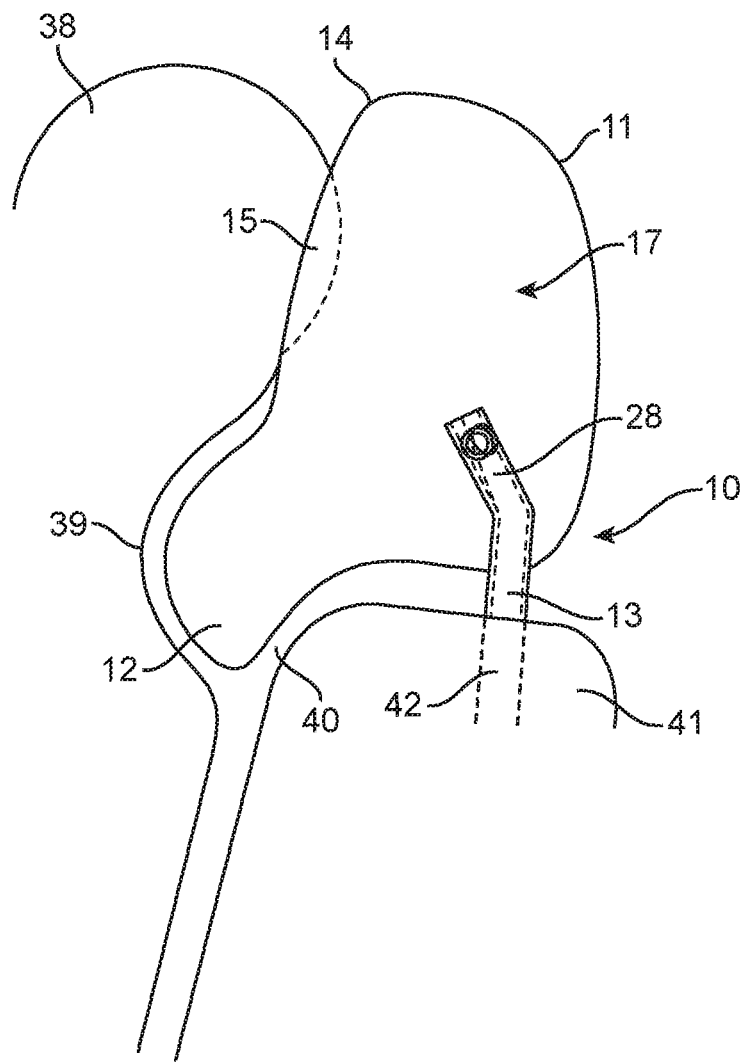
FIG. 7 illustrates a side view of a head rest assembly according to an embodiment of the present invention when in use.

FIG. 7 illustrates a side view of a head rest assembly 10 according to an embodiment of the present invention when in use. In FIG. 7, it may be seen that the back of a user's head 38 is received in the comfort enhancement portion 15 located on the front face 14 of the head support portion 11. The neck support portion 12 projects forwardly of the head support portion 11 so as to be in close proximity to the back of the user's neck 39. It will be noted that a small gap 40 (typically about 10 mm) exists between the body 17 and the vehicle seat 41.

In FIG. 7 it may be seen that the lower ends of the connection members 13 are received in a bore 42 extending into the vehicle seat 41, while the upper ends of the connection members 13 are received within the body 17. It will also be noted that the angled portion 28 of the connection members 13 serves to angle the body 17 towards the user's head 38 so as to provide enhanced comfort and support to the user.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A head rest assembly for a vehicle seat, the head rest assembly comprising:
   a head support portion;
   a neck support portion; and
   a pair of connection members adapted to connect the head rest assembly to the vehicle seat, wherein at least one of the pair of connection members is adapted for movement relative to the other of the pair of connection members so as to adjust a distance between the pair of connection members, said connection members being associated with one another by a movement mechanism, the movement mechanism further comprising:
      a pair of blocks, each block being associated with an upper region of a respective connection member and configured to slide relative to a housing for the movement mechanism to allow relative movement between the blocks;
      a pivot pin positioned in between the blocks; and,
      a connecting plate rotatable about the pivot pin, with each block being coupled to the connecting plate by a respective movable linkage member;
   wherein movement of one of the connection members in an inwardly direction towards the other of the connection members results in sliding movement of the block associated with said one of the connection members thereby effecting movement of the connecting plate linked to the block associated with said one of the connection members which produces a corresponding movement of the other block associated with the connection members linked to the plate due to rotation of the plate relative to the pivot pin.

2. The head rest assembly of claim 1, wherein a front face of the head support portion is provided with one or more comfort and support enhancement portions adapted to enhance the comfort of a user during use of the head rest assembly.

3. The head rest assembly of claim 2, wherein the one or more comfort and support enhancement portions comprise a concave recess or cavity into which the rear of the user's head is at least partially received.

4. The head rest assembly of claim 1, wherein the head support portion and the neck support portion together form a body.

5. The head rest assembly of claim 1, wherein at least a portion of the neck support portion extends forwardly of the head support portion.

6. The head rest assembly of claim 1, wherein the pair of connection members comprise a pair of posts or rods adapted to extend between the head rest portion and the neck support portion.

7. The head rest assembly of claim 1, wherein at least a portion of the connection members is received in a receiving portion in the head support portion or the neck support portion.

8. The head rest assembly of claim 1, wherein the housing is at least partially located within the head support portion or the neck support portion.

9. The head rest assembly of claim 8, wherein the connection members are at least partially received within the housing.

10. The head rest assembly of claim 1, wherein the connection members comprise an upper portion and a lower portion adapted for connection to the vehicle seat and temporary connection to the upper portion.

11. The head rest assembly of claim 10, wherein the lower portions are interchangeable with lower portions having different diameters.

12. The head rest assembly of claim 1, wherein the connection members are provided with one or more bends or curves therein.

13. The head rest assembly of claim 1, wherein at least one bend or curve is provided such that an uppermost region of the connection members is angled forwardly of a remainder of the connection member to form an angled portion.

14. The head rest assembly of claim 13, wherein an included angle between the angled portion and the remainder of the connection member is between 15° and 50°.

15. The head rest assembly in accordance with claim 1 wherein each of the pair of connection members comprise and a lower portion adapted for connection to the vehicle seat and furthermore the lower portions are interchangeable with lower portions having different diameters.

16. The head rest assembly in accordance with claim 1 each of the plurality of said connection members being provided with at least one bend or curve therein, the at least one bend or curve being provided such that an uppermost region of the connection members is angled forwardly of a remainder of the connection member to form an angled portion.

17. The head rest assembly of claim 16, wherein the angled portion ranges between 15° and 50°.

* * * * *